US011972255B2

(12) United States Patent
Bulut et al.

(10) Patent No.: US 11,972,255 B2
(45) Date of Patent: Apr. 30, 2024

(54) COMPLIANCE CONTENT GENERATION

(71) Applicant: International Business Machines Corporation, Armonk, NY (US)

(72) Inventors: Muhammed Fatih Bulut, West Greenwich, RI (US); Abdulhamid Adebowale Adebayo, White Plains, NY (US); Sai Zeng, Yorktown Heights, NY (US); Rinku Kanwar, Parkland, FL (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 17/358,166

(22) Filed: Jun. 25, 2021

(65) Prior Publication Data
US 2022/0413847 A1  Dec. 29, 2022

(51) Int. Cl.
*G06F 8/30* (2018.01)
*G06F 8/10* (2018.01)
*G06F 8/73* (2018.01)

(52) U.S. Cl.
CPC ............ *G06F 8/73* (2013.01); *G06F 8/10* (2013.01); *G06F 8/31* (2013.01)

(58) Field of Classification Search
CPC ................. G06F 21/57–6218; G06F 8/33
(Continued)

(56) References Cited

U.S. PATENT DOCUMENTS 7,665,061 B2 * 2/2010 Kothari ............... G06F 8/30
717/110
7,886,222 B2   2/2011 Bagare
(Continued)

FOREIGN PATENT DOCUMENTS

CN    110162298 A     8/2019
EP      3608825 A1 *  2/2020  ............. G06F 21/55
(Continued)

OTHER PUBLICATIONS

NPL: JP-2001344267—A Text Translation.*
(Continued)

*Primary Examiner* — Francisco J Aponte
(74) *Attorney, Agent, or Firm* — Stephen R. Yoder (57) ABSTRACT

A content generation method includes receiving a control document comprising one or more control clauses, identifying actionable content for the one or more control clauses, generating a programming language template for the one or more control clauses, identifying a closest existing control clause from a database for each of the one or more control clause, identifying a programming language implementation of the closest existing control clause, identifying similarities and differences between the programming language implementation and the generated programming language template, and annotating the programming language implementation for the closest existing control clause based on the identified similarities and differences. The method may additionally include determining whether a closest existing control clause exists, providing the generated programming language template to a user responsive to determining that a closest existing control clause does not exist, and receiving feedback from the user regarding the generated programming language template.

25 Claims, 4 Drawing Sheets

(58) Field of Classification Search
USPC .............................................. 726/2; 717/106
See application file for complete search history.

(56) References Cited

U.S. PATENT DOCUMENTS

| | | | |
|---|---|---|---|
| 8,365,138 B2 | 1/2013 | Iborra | |
| 8,688,676 B2 | 4/2014 | Rush | |
| 8,839,212 B2 | 9/2014 | Cooke | |
| 9,304,743 B1* | 4/2016 | Breslau | G06F 8/51 |
| 9,858,046 B2 | 1/2018 | Weigert | |
| 10,217,462 B2 | 2/2019 | Sarikaya | |
| 10,361,981 B2 | 7/2019 | Bennett | |
| 10,783,243 B2* | 9/2020 | Loch | G06F 12/1416 |
| 10,843,080 B2* | 11/2020 | Hsiao | A63F 13/42 |
| 10,977,429 B2* | 4/2021 | Banerjee | G06N 3/02 |
| 11,010,143 B2* | 5/2021 | Rich | G06F 16/2433 |
| 11,676,582 B2* | 6/2023 | Nowak-Przygodzki | G06F 16/909 704/270.1 |
| 2016/0352744 A1* | 12/2016 | Burrows | G06F 21/6218 |
| 2017/0017641 A1* | 1/2017 | Gidney | G06F 40/289 |
| 2017/0039188 A1* | 2/2017 | Allen | G06F 40/169 |
| 2018/0137090 A1* | 5/2018 | Duan | G06F 40/30 |
| 2018/0150379 A1* | 5/2018 | Ratiu | G06F 11/3608 |
| 2019/0132350 A1* | 5/2019 | Smith | G06F 21/577 |
| 2020/0076752 A1 | 3/2020 | Adam | |
| 2020/0301672 A1* | 9/2020 | Li | G06F 11/3608 |
| 2020/0327172 A1* | 10/2020 | Coquard | G06F 16/9035 |
| 2021/0004209 A1* | 1/2021 | Holt | G06F 8/10 |
| 2021/0026608 A1* | 1/2021 | Mak | G06F 8/433 |
| 2021/0055927 A1* | 2/2021 | Sarukkai | G06F 8/71 |
| 2021/0343292 A1* | 11/2021 | Cox | G06F 3/167 |
| 2022/0012018 A1* | 1/2022 | Trim | G06N 20/00 |
| 2022/0138160 A1* | 5/2022 | Anjum | G06Q 10/103 715/272 |
| 2022/0138690 A1* | 5/2022 | Anjum | G06F 40/131 705/80 |
| 2022/0206759 A1* | 6/2022 | Samuel | G06F 8/10 |
| 2022/0303295 A1* | 9/2022 | Erlingsson | H04L 67/535 |
| 2023/0297355 A1* | 9/2023 | Medicherla | G06F 8/51 717/114 |

FOREIGN PATENT DOCUMENTS

| | | |
|---|---|---|
| JP | 2001344267 A * | 12/2001 |
| TW | 201232398 A | 8/2012 |
| WO | WO-2017142546 A1 * | 8/2017 |

OTHER PUBLICATIONS

Xusheng Xiao et al. "Automated Extraction of Security Policies from Natural-Language Software Documents"; Sigsoft' 12/FSE-20, Nov. 11-16, 2012, Cary, North Carolina, USA.*

Alon et al., "code2vec: Learning Distributed Representations of Code", Proc. ACM Program. Lang., vol. 3, No. POPL, Article 40, Publication date: Jan. 2019, 29 pages.

* cited by examiner

| |
|---|
| 300 — CONTROL CLAUSE |
| Title: Ensure permissions on /etc/group are configured |
| Description: The /etc/group file contains a list of all the valid groups defined in the system. The command below allows read/write access for root and read access for everyone else |
| Rationale: The /etc/group file needs to be protected from unauthorized changes by non-privileged users, but needs to be readable as this information is used with many non-privileged programs |
| Audit Procedure: Run the following command and verify "Uid" and "Gid" are both '0/root' and 'Access' is '644':<br><br># stat /etc/group<br>…<br>Access: (0644/-rw--r--) Uid: (0/root) Gid: (0/root) |
| Remediation Procedure: Run the following command to set permissions on '/etc/group':<br><br>…<br>#chown root:root/etc/group<br><br>#chmod u-x,go-wx/etc/group<br><br>… |

COMPLIANCE CONTENT GENERATION

BACKGROUND

The present invention relates generally to the field of cyber security, and more specifically, to generating compliance content.

In many areas of computing security and compliance, compliance requirements are expressed as textual information. In some cases, implementation of compliance requirements may be achieved by following well established standards existing within a field; in other cases, compliance requirements may correspond to a set of custom requirements developed and implemented "in house". Standards may contain controls that are specific to platforms and applications. A control may contain many details including, but not limited to, title, description, rationale, audit or check, remediation, or fix.

Compliance verification can become exceedingly cumbersome in many environments, especially those with an abundance of applications and platforms requiring hundreds of compliance verifications. Additionally, different versions of standards are implemented regularly, and often require reimplementation of updated scripts to enforce control. Currently, content generation with respect to compliance is a manual time-consuming process. In various scenarios, it can take 1 person-year to generate content for a security benchmark. Given the vast implementations of standards and regulations with respect to a wide variety of secured systems, a multitude of control clauses and corresponding content have already been created with respect to compliance regulations. Current systems in the art fail to adequately take advantage of existing content to effectively minimize the resources necessary to generate compliance content corresponding to new or updated compliance standards and regulations.

SUMMARY

As disclosed herein, a method for generating compliance content includes receiving a control document comprising one or more control clauses, identifying actionable content for the one or more control clauses, generating a programming language template for the one or more control clauses, identifying a closest existing control clause from a database for each of the one or more control clause, identifying a programming language implementation of the closest existing control clause, identifying similarities and differences between the programming language implementation and the generated programming language template, and annotating the programming language implementation for the closest existing control clause based on the identified similarities and differences.

As disclosed herein, a computer program product for generating compliance content includes one or more computer readable storage media and program instructions stored on the one or more computer readable storage media, the program instructions comprising instructions to: receive a control document comprising one or more control clauses, identify actionable content for the one or more control clauses, generate a programming language template for the one or more control clauses, identify a closest existing control clause from a database for each of the one or more control clauses, identify a programming language implementation of the closest existing control clause, identify similarities and differences between the programming language implementation and the generated programming language template, and annotate the programming language implementation for the closest existing control clause based on the identified similarities and differences.

As disclosed herein, a computer system for generating compliance content includes one or more computer processors, one or more computer-readable storage media, and program instructions stored on the computer-readable storage media for execution by at least one of the one or more processors, the program instructions comprising instructions to: receive a control document comprising one or more control clauses, identify actionable content for the one or more control clauses, generate a programming language template for the one or more control clauses, identify a closest existing control clause from a database for each of the one or more control clauses, identify a programming language implementation of the closest existing control clause, identify similarities and differences between the programming language implementation and the generated programming language template, and annotate the programming language implementation for the closest existing control clause based on the identified similarities and differences.

As disclosed herein, a computer implemented method for generating compliance content includes receiving a control document comprising one or more control clauses, identifying actionable content for the one or more control clauses, generating a programming language template for the one or more control clauses, determining whether a closest existing control clause exists, responsive to determining that a closest existing control clause does not exist, providing the generated programming language template to a user, and receiving feedback from the user regarding the generated programming language template.

As disclosed herein, a computer program product for generating compliance content includes one or more computer readable storage media and program instructions stored on the one or more computer readable storage media, the program instructions comprising instructions to: receive a control document comprising one or more control clauses, identify actionable content for the one or more control clauses, generate a programming language template for the one or more control clauses, determine whether a closest existing control clause exists, responsive to determining that a closest existing control clause does not exist, provide the generated programming language template to a user, and receive feedback from the user regarding the generated programming language template.

DETAILED DESCRIPTION

The present invention will now be described in detail with reference to the Figures. Implementation of embodiments of the invention may take a variety of forms, and exemplary implementation details are discussed subsequently with reference to the Figures.

Figure 1:
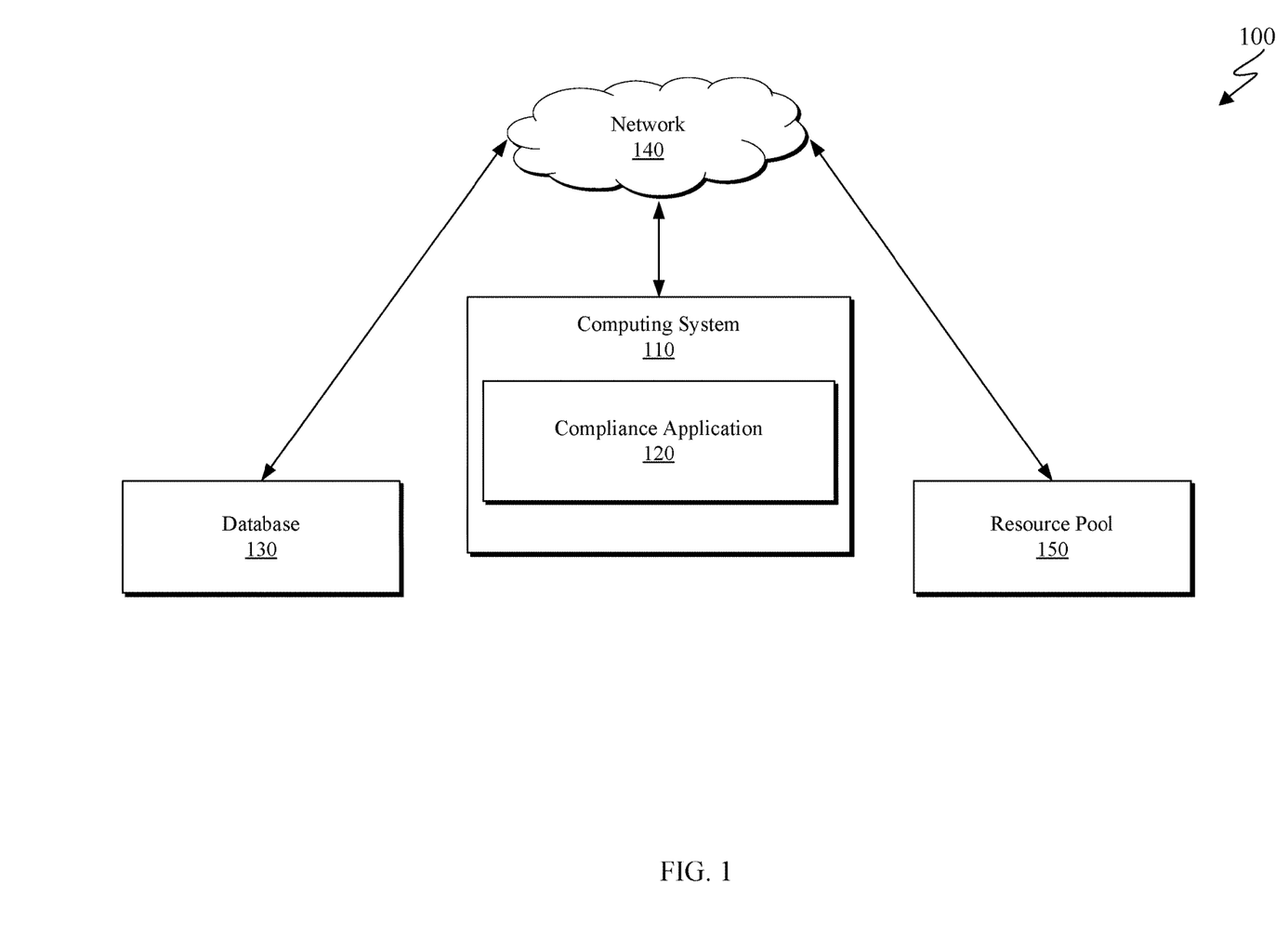
FIG. 1 is a block diagram depicting a compliance management system in accordance with at least one embodiment of the present invention.

FIG. 1 is a block diagram depicting a compliance management system 100 in accordance with at least one embodiment of the present invention. As depicted, compliance management system 100 includes computing system 110, database 130, network 140, and resource pool 150. It should be appreciated that compliance management system 100 corresponds to one of many arrangements of resources which may be suitable for such a system; for example, while the depicted embodiment has all elements independently located, additional embodiments may exist where any of computing system 110, database 130, and resource pool 150 are collocated.

Computing system 110 can be a desktop computer, a laptop computer, a specialized computer server, or any other computer system known in the art. In some embodiments, computing system 110 represents computer systems utilizing clustered computers to act as a single pool of seamless resources. In general, computing system 110 is representative of any electronic device, or combination of electronic devices, capable of receiving and transmitting data, as described in greater detail with regard to FIG. 4. Computing system 110 may include internal and external hardware components, as depicted and described in further detail with respect to FIG. 4.

As depicted, computing system 110 includes compliance application 120. Compliance application 120 may be configured to generate and manage control clauses corresponding to compliance with respect to a variety of standards and/or regulations. In some embodiments, compliance application 120 is configured to execute a content generation method for creating content corresponding to compliance control clauses. One example of a suitable content generation method is described with respect to FIG. 2.

Data store 130 may be configured to store received information and can be representative of one or more databases that give permissioned access to computing system 110 or publicly available databases. In general, data store 130 can be implemented using any non-volatile storage media known in the art. For example, data store 130 can be implemented with a tape library, optical library, one or more independent hard disk drives, or multiple hard disk drives in a redundant array of independent disk (RAID). In at least some embodiments, data store 130 is configured to store control clauses for future access by at least computing system 110.

Resource pool 150 refers generally to any combination of resources monitored by, or corresponding to, computing system 110 and compliance application 120. It should be appreciated that resource pool 150, though depicted as a single entity, may correspond to a multitude of resources hosted in any number of systems and locations. In general, resource pool 150 corresponds to any resource(s) whose security is managed by compliance application 120. It should also be appreciated that resource pool 150 corresponds to any number of applications or platforms whose compliances to regulations and standards are the responsibility of compliance application 120.

Network 140 can be, for example, a local area network (LAN), a wide area network (WAN) such as the Internet, or a combination of the two, and include wired, wireless, or fiber optics connections. In general, network 140 can be any combination of connections and protocols that will support communications between computing system 110, database 130, and resource pool 150.

Figure 2:
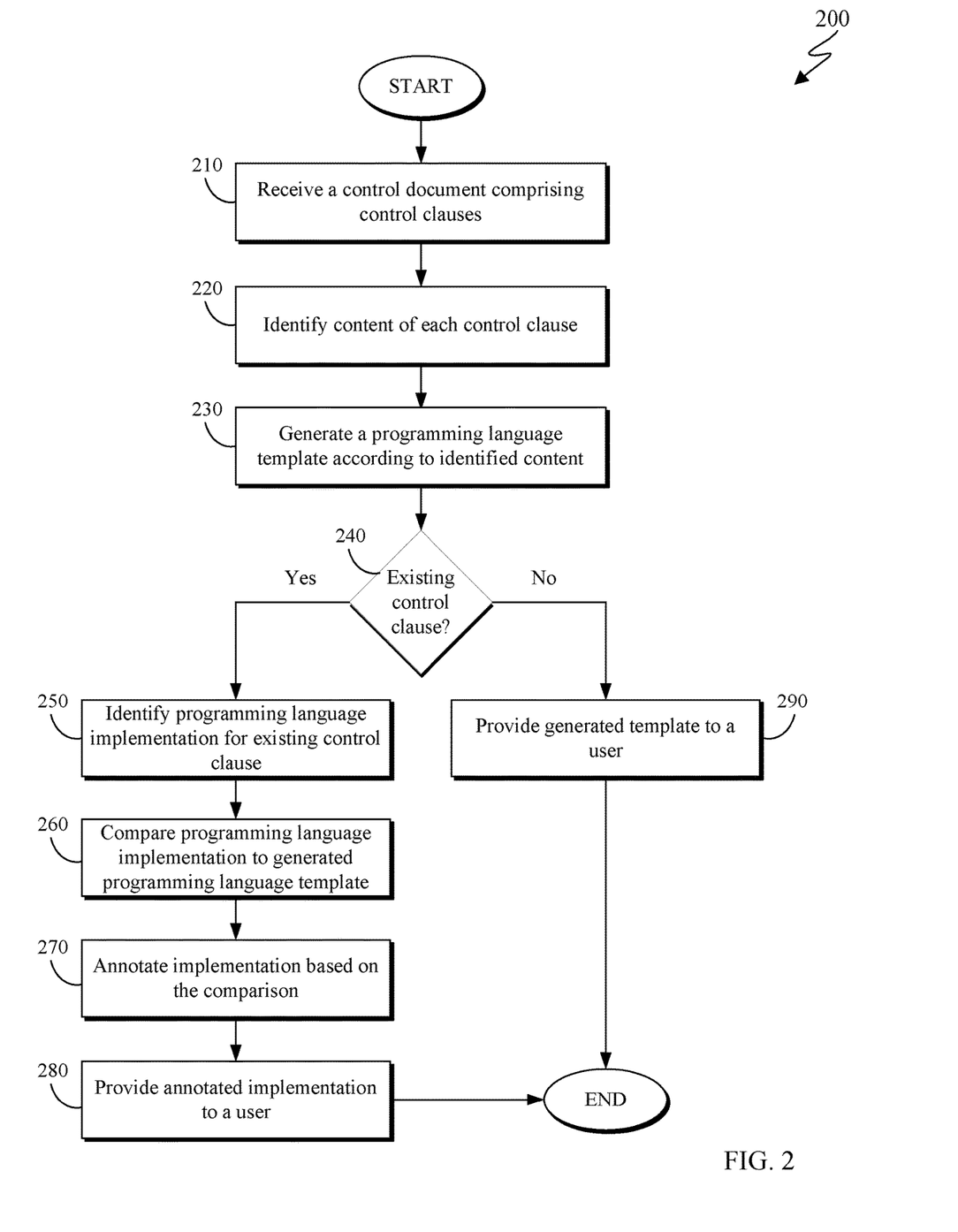
FIG. 2 is a flowchart depicting a content generation method in accordance with at least one embodiment of the present invention.

FIG. 2 is a flowchart depicting a content generation method 200 in accordance with at least one embodiment of the present invention. As depicted, content generation method 200 includes receiving (210) a control document comprising one or more control clauses, identifying (220) content of each control clause, generating (230) a programming language template, determining (240) whether a similar control clause exists, identifying (250) a programming language implementation for the similar existing control clause, comparing (260) the programming language implementation to the generated programming language template, annotating (270) the implementation based on the comparison, providing (280) the annotated implementation to a user, and providing (290) the generated template to a user. Content generation method 200 may enable increased efficiency when generating content for new requirements.

Receiving (210) a control document comprising one or more control clauses may include receiving one or more documents indicating control clauses corresponding to compliance requirements. In at least some embodiments, control documents refer generally to any received indicator containing information about enforced compliance standards, regulations, or requirements. As used herein, controls and control clauses refer to components of standards which are specific to various platforms and applications. A control document may include control clauses corresponding to a single application or may include all control clauses corresponding to a regulation or set of standards, or anywhere in between.

Identifying (220) content of each control clause may include identifying details as disclosed by a control clause. In at least some embodiments, a control clause includes a title, which is a tag for the control indicating its function or intention. A control clause may additionally include a description, which offers explanation for what the control clause is directed towards, as well as potential impacts of said clause. In at least some embodiments, a control clause includes a rationale, which describes the circumstances creating a need for the conditions of the control clause. A control clause may additionally include an audit procedure, which is an indication of a methodology through which compliance with the control clause can be audited and confirmed. In at least some embodiments, a control clause includes a remediation procedure, which is an indication of a methodology via which the applications or platforms can be fixed. In general, a control clause contains content which may be separated into text (such as title, description, etc.) and code (remediation, audit, etc.) pieces. One example of a control clause is depicted further with respect to FIG. 3.

Identifying (220) content of each control clause may additionally include identifying code from text portions of said control clause. The code may be identified according to the following algorithm, divided into a portion for training and a subsequent portion for classification of the text.

Training:

INPUT: Lines of text $(I_1, I_2,...,I_n)$ and lines which are codes $(c_1, c_2, \ldots, c_m)$
X = training input data
Generate numerical representations of each $I_j$ and $C_j$ and add to training data X. Add corresponding line type (code or text) to output list Y (code = 0, line = 1)
Train a machine learning model (SVM, Random Forests, etc.) with X as input and Y as output Classification:

```
INPUT: Lines of a subject (h₁, h₂, . . . , hₖ)
code_list = [ ]
for i=0 to k:
    w = Generate numerical representation for hᵢ
    Feed W to model as trained above
    If result == 0:
        Add hᵢ to the code_list
    Return code_list
```

Identifying (220) content of each control clause may additionally include identifying actions from text according to the following algorithm:

Training:

```
INPUT: Lines of text (I₁, I₂,...,Iₙ) and lines which are codes
(c₁, c₂, . . . , cₘ)
    Tag each word in Iᵢ with a corresponding action (Named-entity); for
example: run, check, check if exists, etc..
    X = Generated numerical representations of each Iᵢ using word/sentence
embedding techniques
    Y = Output array of named-entities wherein each position indicates a
label (named entity) of each word in Iᵢ
    Train a deep learning model LSTM, etc.) with X as input and Y as
output
```

Classification:

```
INPUT: Lines of a subject (h₁, h₂, . . . , hₖ) and corresponding code lines
(g₁, g₂, ..., gₖ)
code_list = [ ]
for i=0 to k:
X = Generate numerical representation for hᵢ
Feed X to model as trained above
Return output Y
```

Generating (230) a programming language template may include creating a template which may be used to generate program language corresponding to the identified content of a control clause. In at least some embodiments, generating (230) a programming language template includes creating a template corresponding to the code portions of the control clause. Generating (230) a programming language template may additionally include determining whether any actions are indicated by the text pieces of the control clause that are not captured by the code pieces. If additional actions are indicated by the text pieces, generating (230) a programming language template may additionally include incorporating programming language for these additional actions into the generated programming language template. Generating (230) a programming language template may additionally include identifying what actions are performed according to the corresponding code. Generating (230) a programming language template may be executed by inputting a series of action code pairs wherein an action $a_i$ and a corresponding code segment ci are paired. In such embodiments, generating (230) a programming language template further includes identifying code implementations corresponding to the actions and adding these implementations to the template for each action. In general, generating (230) a programming language template corresponding to the content of each control clause includes creating programming language model capturing the actions indicated by the control clause.

Determining (240) whether a similar control clause exists may include identifying a database or other data store via which other control clauses are available. In some embodiments, determining (240) whether a similar control clause exists includes querying a dedicated data store for a similar control clause. In at least some embodiments, a threshold for similarity between clauses may be set such that only clauses exceeding a certain similarity level are returned responsive to a query. Determining (240) whether a similar control clause exists may include leveraging the generated programming language template as a point of comparison, such that potentially similar control clauses are compared based on the actionable portions of the clauses as indicated by the generated programming language template. In other words, similar control clauses may be identified according to their code portions as described above. In some embodiments, a cursory keyword search against the text portions of clauses (title, description) to initially filter a potential large list of potentially similar clauses, after which point a full comparison of the code portions may be enacted. In general, two control clauses may be considered to be similar if they contain program code configured to execute similar operations or transformations. In at least some embodiments, determining (240) whether a similar control clause exists may additionally include comparing one or more sets of standards to which the control clauses adhere or contribute.

In at least one embodiment, determining (240) whether a similar control clause exists occurs according to the following algorithm:

```
INPUT: Searched control text (t), list of potential controls to be matched
(t₁, t₂, . ., tᵢ, tₙ)
r = generated numerical representation of given control text (t) using
language and word embedding techniques (such as BERT, word2vec,
doc2vec, etc.)
distance_list = [ ]
for i=0 to n:
    rᵢ = generated numerical representation for tᵢ
    dᵢ = calculated distance between r and rᵢ
    Add dᵢ to distance_list
OUTPUT: Minimum(distance_list)
```

The subject algorithm identifies the control clause whose text has numerical representation that is the smallest distance away from the numerical representation of the subject control clause.

Identifying (250) a programming language implementation for the similar existing control clause may include identifying an instance in which the similar existing control clause has been implemented. With respect to this implementation instance, identifying (250) a programming language implementation may include extracting one or more portions of programming language with respect to said instance which correspond to the implementation of the similar existing control clause. The control clause implementation may be a part of a larger compliance implementation, such that not all portions of the identified instance correspond to the implementation of the similar control clause. In such embodiments, identifying (250) a programming language implementation for the similar existing control clause includes identifying portions of the code corresponding to the total implementation which are directed towards the implementation of the similar existing control clause. Identifying such sections may include identifying any code in the total implementation which corresponds to the intended actions of the similar existing control clause. Identifying the corresponding sections may additionally include parsing descriptions of the similar existing control clause to identify the subject actions of the similar existing control clause and subsequently extracting them.

Comparing (260) the programming language implementation to the generated programming language template may include comparing the identified programming language implementation corresponding to the similar existing control clause to the generated programming language template which had been created with respect to the initial control clause. Comparing (260) the programming language implementation to the generated programming language template may include identifying any sections of code which may appear in the implementation that do not correspond to any sections of the generated programming language template. Similarly, comparing (260) the programming language implementation to the generated programming language template may include identifying any sections of the generated programming language template for which a corresponding section of the programming language implementation seemingly does not exist. In such embodiments where a section of the template is not satisfied by the programming language implementation, comparing (260) may additionally include analyzing an overall implementation from which the programming language implementation was taken and determining whether additional actions or sections of the total implementation correspond to said section of the template.

Annotating (270) the implementation based on the comparison may include generating text descriptions of the differences between the programming language implementation and the generated programming language template. In some embodiments, annotating (270) the implementation includes applying a tag to the programming language implementation indicating its similarities and differences with respect to the subject initial control clause. Annotating (270) the implementation may additionally include describing any number of regulations or standards with which the implementation complies based on analogous compliances to which the subject initial control clause adheres. In some embodiments, annotating (270) the implementation based on the comparison may additionally include annotating the generated programming language template indicating manners in which the various sections of the template are met by concrete implementations. In general, annotating (270) the implementation includes generating descriptions corresponding to the similarities and differences between the programming language implementation and the generated programming language template, such that the comparison may be easily understood by a user.

Providing (280) the annotated implementation to a user may include making the annotated implementation available to a user. In at least some embodiments, providing (280) the annotated implementation to a user includes sending the annotated implementation to the data store through which said implementation was initially made available. Providing (280) the annotated implementation to a user may include providing a graphical user interface through which the annotated implementation is available for viewing and/or manipulation to a user.

Providing (290) the generated template to a user may include making the generated template available to a user. In at least some embodiments, providing (290) the generated template to a user includes sending the generated template to the data store through which programming code implementations were made available. Providing (290) the generated template to a user may include providing a graphical user interface through which the generated template is available for viewing and/or manipulation to a user. Providing (290) the generated template to a user may additionally include prompting the user for feedback regarding the template, such that the user may provide an indication of the accuracy of the generated template. In such embodiments wherein user feedback is received and incorporated, said feedback may be quantified and fed back into the template generation module to improve further implementations.

Figure 3:
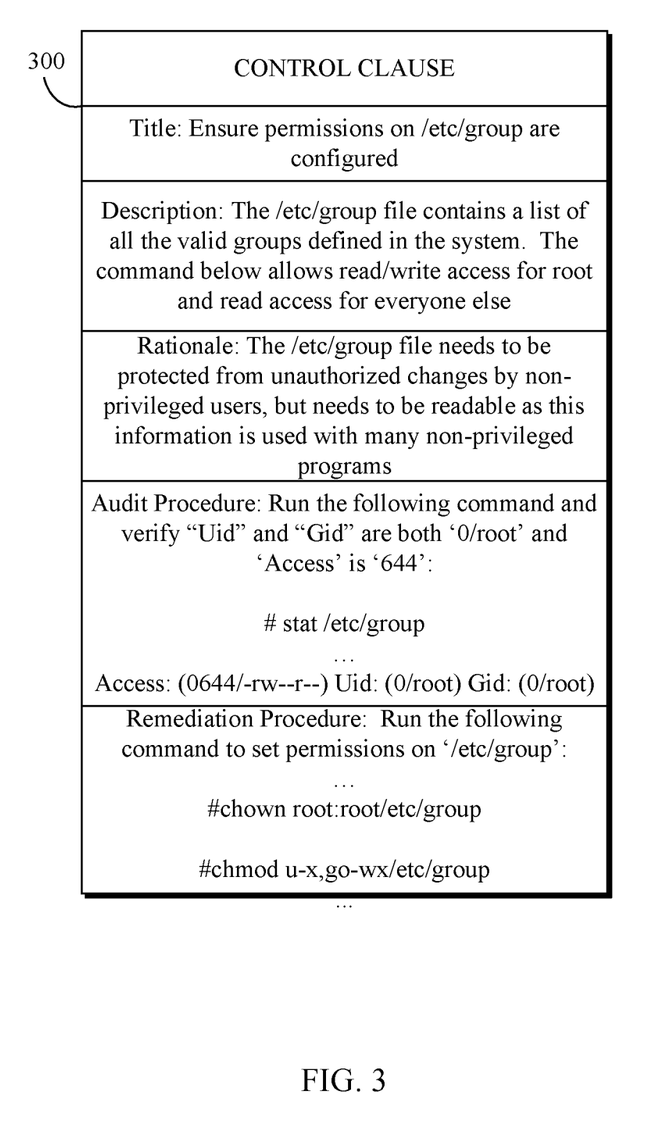
FIG. 3 depicts an example control clause in accordance with an embodiment of the present invention.

FIG. 3 depicts an example control clause 300 in accordance with an embodiment of the present invention. As depicted, control clause 300 is divided into a plurality of sections, notably a title, description, rationale, audit procedure, and remediation procedure. The title section reads "Ensure permissions on/etc/group are configured", and in general is included to adequately identify the clause. The description section reads "The/etc/group file contains a list of all the valid groups defined in the system. The command below allows read/write access for root and read access for everyone else", and in general is included to describe the impacts and effects of execution of the control clause. The rationale section reads "The/etc/group file needs to be protected from unauthorized changes by non-privileged users but needs to be readable as this information is used with many non-privileged programs", and in general is included to describe the conditions or set of conditions which necessitate the actions of the control clause. The audit procedure section recites explicit commands which may be executed to effectively audit or validate compliance with the standard(s) or regulation(s) necessitated and are generally included to enable compliance to be easily checked. The remediation procedure section recites explicit commands which may be executed to set the conditions of the control clause in action and are generally included to enable the intended actions of the control clause to be implemented.

FIG. 3 and control clause 300 are included merely to show one example of an appropriate control clause associated subsections; it should be appreciated that any number of formats and combinations of subsections may be appropriate for describing a control clause in general.

Figure 4:
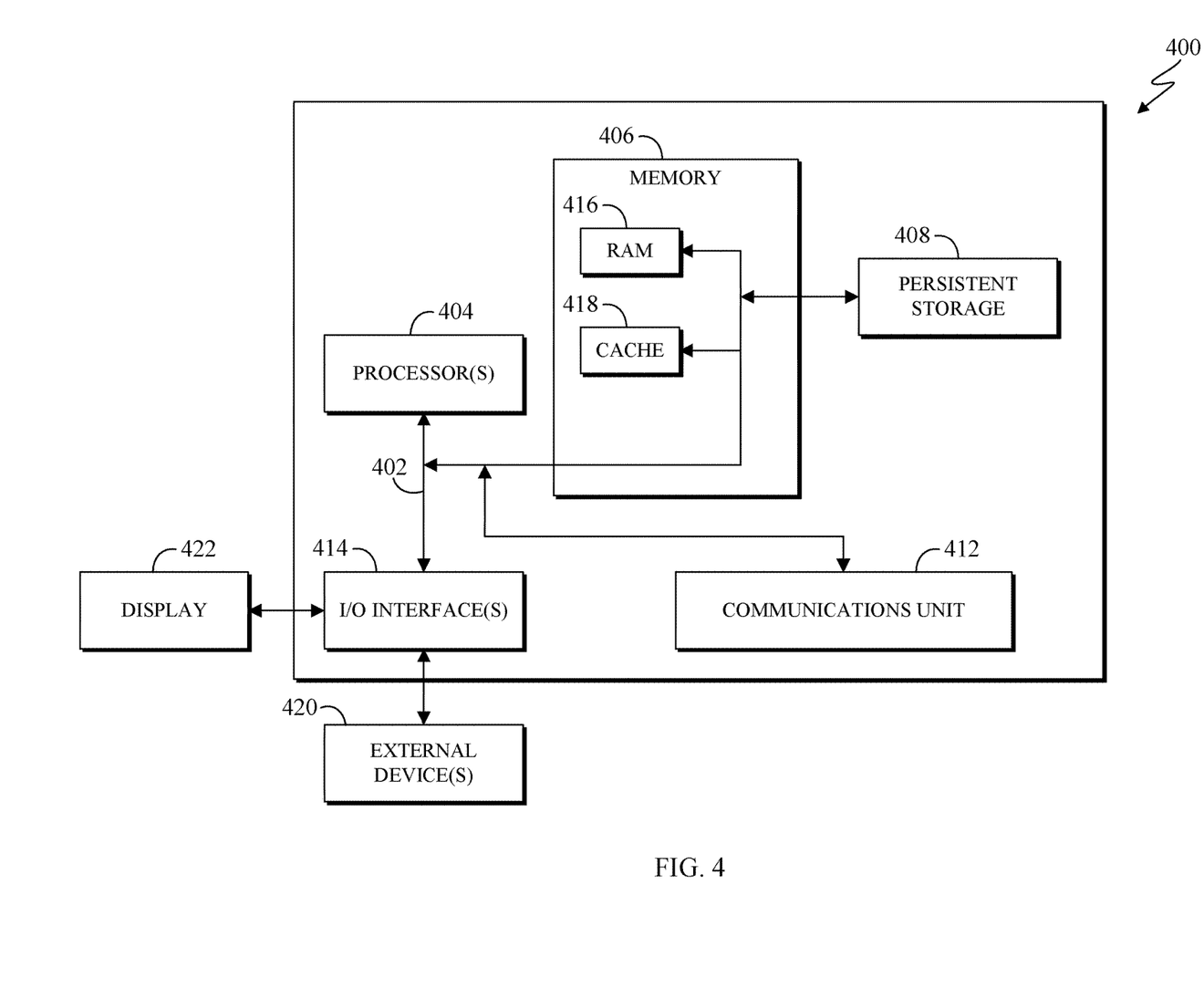
FIG. 4 is a block diagram of components of a computing system in accordance with an embodiment of the present invention.

FIG. 4 depicts a block diagram of components of computing system 110 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for generating compliance clause content, the computer implemented method comprising:
   receiving a control document comprising one or more control clauses;
   identifying actionable content for the one or more control clauses;
   generating a programming language template for the one or more control clauses, wherein the programming language template includes a programming language model capturing the actionable content from the one or more control clauses;
   identifying a closest existing control clause from a database for each of the one or more control clauses;
   identifying a programming language implementation of the closest existing control clause;
   identifying similarities and differences between the programming language implementation and the generated programming language template; and
   annotating the programming language implementation for the closest existing control clause to indicate the identified similarities and differences.

2. The computer implemented method of claim 1, further comprising providing the annotated programming language implementation to a user.

3. The computer implemented method of claim 1, wherein the actionable content includes description text indicating one or more actions corresponding to the one or more control clauses.

4. The computer implemented method of claim 1, wherein the actionable content includes program language text.

5. The computer implemented method of claim 2, further comprising receiving feedback from the user regarding the annotated programming language implementation.

6. A computer program product for generating compliance clause content the computer program product comprising:
   at least one computer readable storage medium and program instructions stored on the at least one computer readable storage medium, the program instructions comprising instructions to:
   receive a control document comprising one or more control clauses;
   identify actionable content for the one or more control clauses;
   generate a programming language template for the one or more control clauses, wherein the programming language template includes a programming language model capturing the actionable content from the one or more control clauses;
   identify a closest existing control clause from a database for each of the one or more control clauses;
   identify a programming language implementation of the closest existing control clause;
   identify similarities and differences between the programming language implementation and the generated programming language template; and
   annotate the programming language implementation for the closest existing control clause to indicate the identified similarities and differences.

7. The computer program product of claim 6, further comprising instructions to provide the annotated programming language implementation to a user.

8. The computer program product claim 6, wherein the actionable content includes description text indicating one or more actions corresponding to the one or more control clauses.

9. The computer program product of claim 6, wherein the actionable content includes program language text.

10. The computer program product of claim 7, further comprising instructions to receive feedback from the user regarding the annotated programming language implementation.

11. A computer system for generating compliance clause content, the computer system comprising:
    one or more computer processors;
    one or more computer-readable storage media;
    program instructions stored on the computer-readable storage media for execution by at least one of the one or more processors, the program instructions comprising instructions to:
    receive a control document comprising one or more control clauses;

identify actionable content for the one or more control clauses;
generate a programming language template for the one or more control clauses, wherein the programming language template includes a programming language model capturing the actionable content from the one or more control clauses;
identify a closest existing control clause from a database for each of the one or more control clauses;
identify a programming language implementation of the closest existing control clause;
identify similarities and differences between the programming language implementation and the generated programming language template; and
annotate the programming language implementation for the closest existing control clause to indicate the identified similarities and differences.

12. The computer system of claim 11, further comprising instructions to provide the annotated programming language implementation to a user.

13. The computer system of claim 11, wherein the actionable content includes description text indicating one or more actions corresponding to the one or more control clauses.

14. The computer system of claim 11, wherein the actionable content includes program language text.

15. The computer system of claim 12, further comprising instructions to receive feedback from the user regarding the annotated programming language implementation.

16. A computer implemented method for generating compliance clause content, the computer implemented method comprising:
receiving a control document comprising one or more control clauses;
identifying actionable content for the one or more control clauses;
generating a programming language template for the one or more control clauses, wherein the programming language template includes a programming language model capturing the actionable content from the one or more control clauses;
determining whether a closest existing control clause exists by comparing the one or more control clauses to one or more candidate existing control clauses;
responsive to determining that a closest existing control clause does not exist, annotating the generated programming language template to indicate manners in which various sections of the template are not met by the one or more candidate existing control clauses; and
providing the generated programming language template to a user.

17. The computer implemented method of claim 16, further comprising annotating the generated program language template according to feedback received from the user.

18. The computer implemented method of claim 16, wherein the actionable content includes program language text.

19. The computer implemented method of claim 16, wherein the actionable content includes description text indicating one or more actions corresponding to the one or more control clauses.

20. The computer implemented method of claim 16, further comprising training a machine learning model to identify the actionable content for the one or more control clauses.

21. A computer system for generating compliance clause content, the computer system comprising:
one or more computer processors;
one or more computer-readable storage media;
program instructions stored on the computer-readable storage media for execution by at least one of the one or more processors, the program instructions comprising instructions to:
receive a control document comprising one or more control clauses;
identify actionable content for the one or more control clauses;
generate a programming language template for the one or more control clauses, wherein the programming language template includes a programming language model capturing the actionable content from the one or more control clauses;
determine whether a closest existing control clause exists by comparing the one or more control clauses to one or more candidate existing control clauses;
responsive to determining that a closest existing control clause does not exist, annotate the generated programming language template to indicate manners in which various sections of the template are not met by the one or more candidate existing control clauses; and
providing the generated programming language template to a user.

22. The computer system of claim 21, further comprising instructions to annotate the generated program language template according to feedback from the user.

23. The computer system of claim 21, wherein the actionable content includes program language text.

24. The computer system of claim 21, wherein the actionable content includes description text indicating one or more actions corresponding to the one or more control clauses.

25. The computer system of claim 21, further comprising training a machine learning model to identify the actionable content for the one or more control clauses.

* * * * *